Feb. 10, 1942.   R. A. YOHPE   2,272,861
PRESSURE GAUGE MOUNTING
Filed June 30, 1941

INVENTOR.
Reinhard A. Yohpe
BY
ATTORNEYS.

Patented Feb. 10, 1942

2,272,861

UNITED STATES PATENT OFFICE 2,272,861

PRESSURE GAUGE MOUNTING

Reinhard A. Yohpe, Battle Creek, Mich., assignor to Union Steam Pump Company, Battle Creek, Mich.

Application June 30, 1941, Serial No. 400,408

1 Claim. (Cl. 285—140)

This invention relates to improvements in pressure gauge mountings.

The main objects of my invention are:

First, to provide a novel and improved mounting for a pressure gauge, and in particular for such a gauge as is employed in homogenizing, emulsifying or like apparatus.

Second, to provide a pressure gauge mounting which is characterized by the simplicity of its construction, ease of installation and effectiveness in sealing the stem of the gauge so as to prevent leakage of the fluid under compression therepast.

Third, to provide such a gauge which may be turned to face in any direction and which is adequately sealed against leakage.

Fourth, to provide such a gauge which may be easily removed for cleaning and may be likewise easily replaced.

Further objects relating to details and economies of my invention will appear from the description to follow. The invention is defined in the claim.

A structure embodying the features of my invention is illustrated in the accompanying drawing, wherein.

Figure 1:
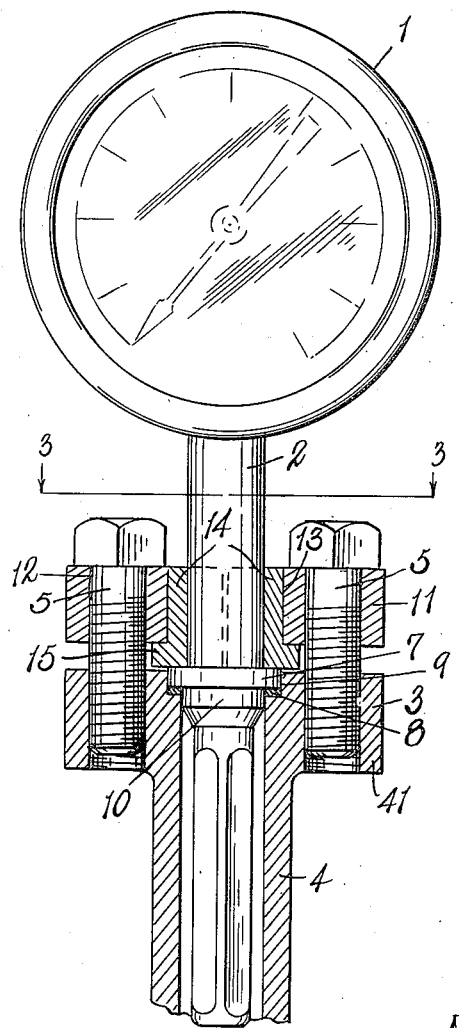
Fig. 1 is a fragmentary view in section on line 1—1 of Fig. 3, illustrating the gauge mounting of my invention.

This invention relates to a mounting for liquid pressure gauges such as are commonly employed in machines for homogenization or emulsification of fatty liquids, though it will be apparent from the description to follow that the mounting of my invention is equally well adapted for use with other types of apparatus, and in connection with instruments other than pressure gauges. As hereinafter described, the structure of the invention is exceedingly compact, economical and easy to install, yet it performs its duties of sealing the instrument against the leakage of liquid or pressure with great effectiveness.

Referring to the drawing, reference numeral 1 designates a pressure gauge of conventional type having a hollow stem 2 which is in interior communication with the liquid or fluid under compression, for example, in the casing or pump cylinder block 3 of a homogenizer or other equipment, the block in this case being provided with a suitable well 4 for the reception of the extremity of the stem 2, and with bosses 41 which are tapped for the reception of the securing bolts 5 to be hereinafter described.

In carrying the provisions of my invention into practice, I provide an enlarged shoulder 7 on the stem 2, said shoulder being engageable with the sealing gasket or washer 8 disposed in a counterbore 9 in the well 4, and an annular step 10 which is telescopingly engageable with the bore of the well, as illustrated in Fig. 1. This serves to initially center and locate the gauge in the block 4 of the apparatus.

Figure 2:
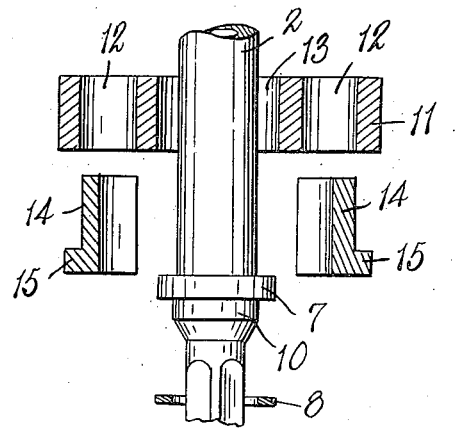
Fig. 2 is a view generally similar to Fig. 1, showing the parts in separated disassembled position and indicating the manner in which the same are operatively assembled.

The parts of the mounting are held in place by a retaining cap 11 which is drilled at 12 in accordance with the location of the tapped holes in the block for the reception of bolts 5 and is provided with a central opening 13 for the reception of the stem 2 of the gauge, it being noted that this opening is of sufficiently large diameter to enable the cap 11 to be telescoped over shoulder 7 in the direction of the casing of the gauge, as illustrated in Fig. 2.

Figure 3:
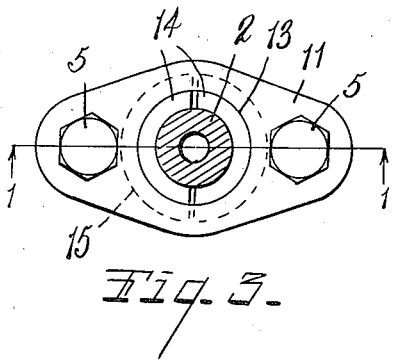
Fig. 3 is a top plan view in section on line 3—3 of Fig. 1, further illustrating the construction.

For coaction with the gauge stem 2, the shoulder 7 and the cap 11, I provide a split sleeve-like packing 14 in two or more similar parts. These parts have segmental peripheral flange portions 15 at the lower edge thereof adapted to be assembled in the manner illustrated in Fig. 3 to provide an annular flanged sleeve-like metallic packing concentric with the stem of the gauge. In assembling the structure, the parts 14 are brought together concentrically of the stem 2 with the flanges thereof resting on annular shoulder 7. The latter is then slipped into the counterbore in the well 4 and cap 11 brought down over the sleeve parts in telescoping, encircling relation thereto, as shown in Figs. 1 and 3, with the lower edge of the cap engaging the flange on the sleeve, thus urging the shoulder 7 into compressing sealing engagement with the washer 8 surrounding the stem. This provides a mounting for the gauge which is sturdy, exceedingly inexpensive and very effective in preventing liquid or fluid leakage and loss of compression axially of the stem. The parts are very easily brought together and set up in operating relation.

The gauge may be turned in the mounting to face in any direction and the seal remains effective. The bolts cannot come into contact with the liquid in the casing and serve as a breeding place for bacteria if the homogenizer is used for milk or the like. The gauge is thus highly desirable for homogenizing milk or cream and will easily pass public health requirements.

The embodiment of the invention which incorporates the principles of the invention in a highly desirable manner have been illustrated and described. It should be understood that the foregoing terminology is used only descriptively rather than in a limiting sense, and with full intention to include equivalents of the features shown and described, within the scope of the following claim.

Having thus described my invention, what I claim as new and desire to secure by Letters Patent is:

A gauge having a stem, an annular shoulder on said stem, a cap having an opening of larger size than said stem and shoulder for the reception thereof, means for securing said cap to a block or gauge well, and a multiple-part annular sleeve fitting in said opening in said cap and in snug encircling engagement with the stem, parts of the said sleeve being provided with segmental peripheral flanges at the lower end thereof and of a diameter larger than the opening of said cap and axially engageable by said cap and engageable with said shoulder to urge the parts axially to operative position.

REINHARD A. YOHPE.